J. W. REFORD.
APPARATUS FOR DISTILLING AND RECTIFYING LIQUORS.
No. 171,426. Patented Dec. 21, 1875.

WITNESSES. INVENTOR.

UNITED STATES PATENT OFFICE.

JOSEPH W. REFORD, OF NEW YORK, N. Y., ASSIGNOR TO WILLIAM WATT, OF SAME PLACE.

IMPROVEMENT IN APPARATUS FOR DISTILLING AND RECTIFYING LIQUORS.

Specification forming part of Letters Patent No. 171,426, dated December 21, 1875; application filed June 30, 1875.

*To all whom it may concern:*

Be it known that I, Jos. WM. REFORD, of New York, in the county of New York and State of New York, have invented certain new and useful Improvements in Distilling and Rectifying Liquors; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of my invention is the production of the highest grade of fine Cologne spirits from the fermented mash at one operation, thereby economizing time, labor, expense, and material.

High-proof spirits have heretofore ordinarily been produced by first producing high-wines from the mash thirty-six to fifty per cent. over proof, then reducing same to proof by the addition of water, and subsequently filtering through clarifying substances. This process requires two or more operations, occupies much time, and is attended with great expense and loss.

In order to enable those skilled in the art to thoroughly understand and construct my invention, I will proceed to describe the same, reference being had to the accompanying drawings and letters of reference thereon.

Figure 1:
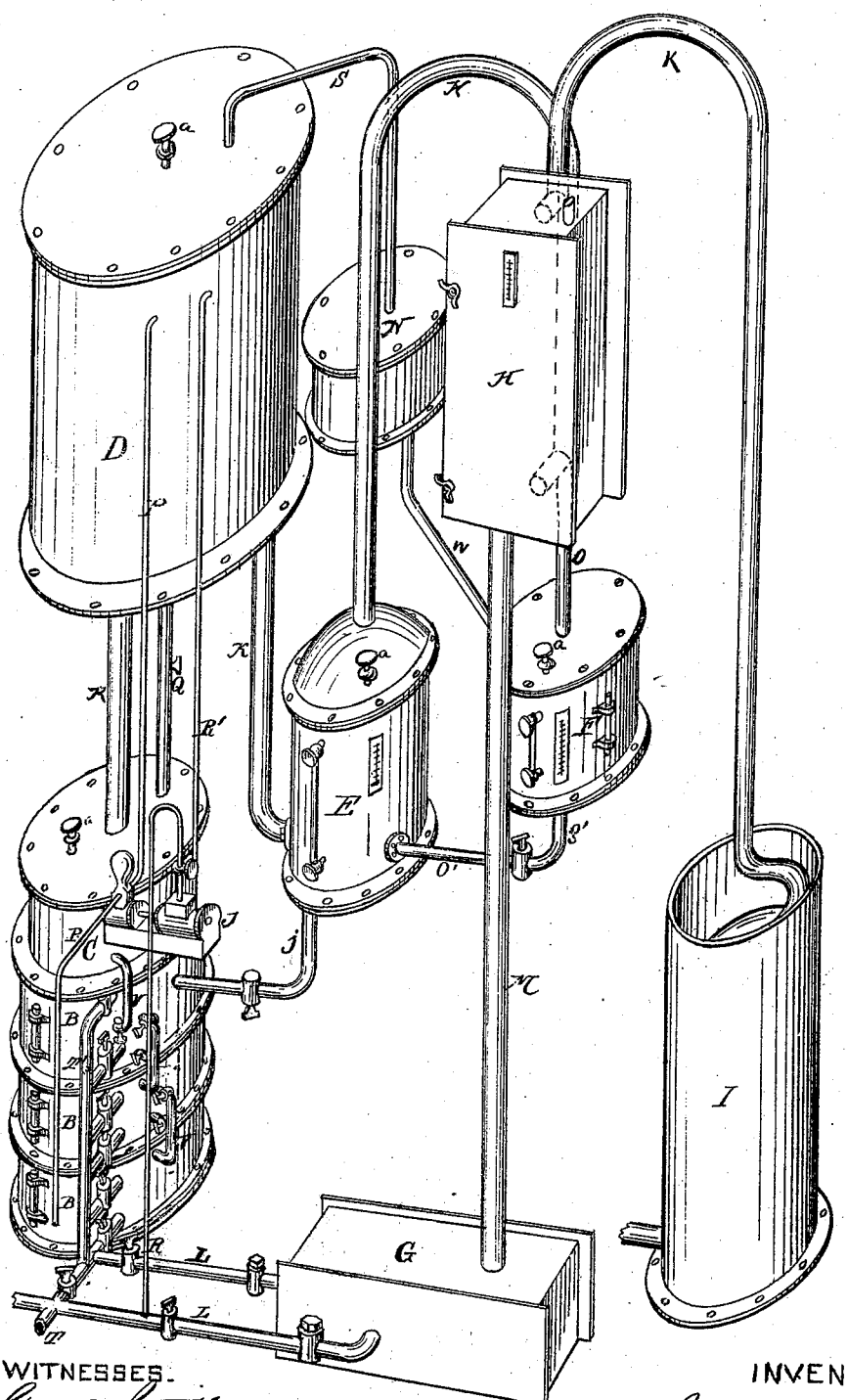
Figure 2:
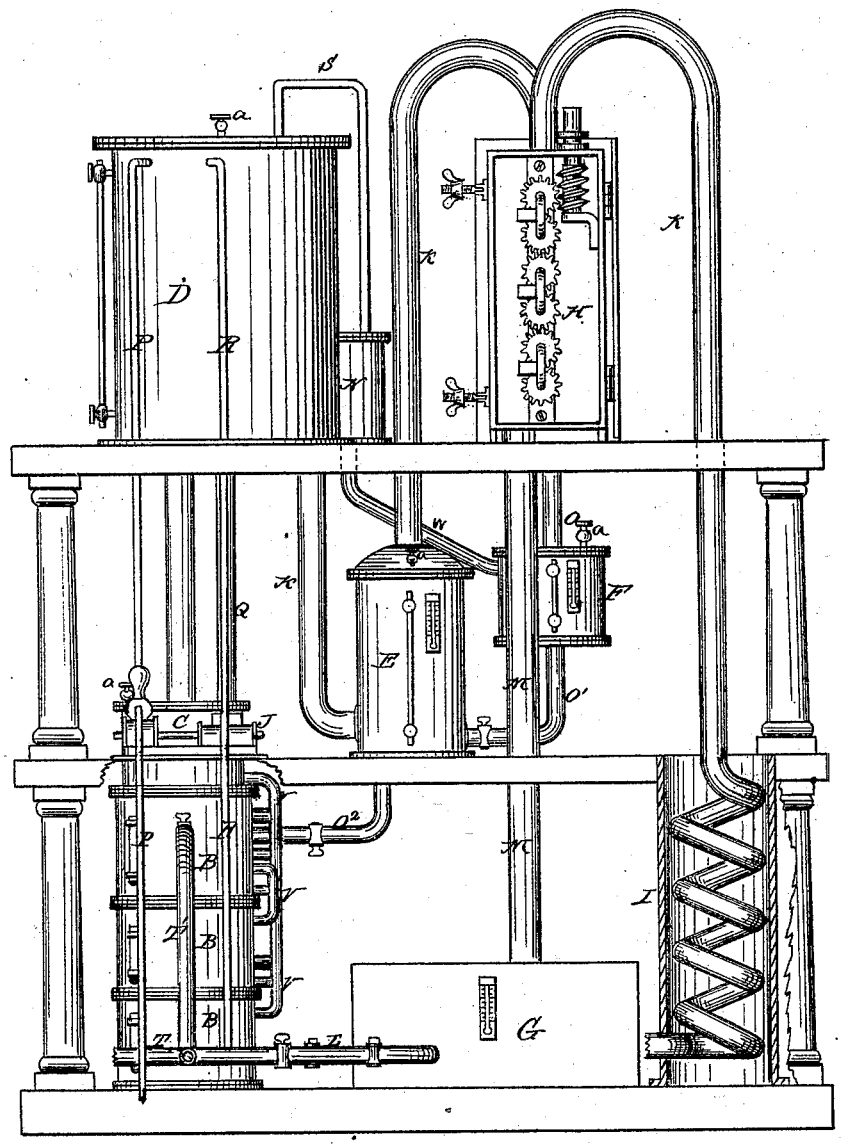
Figure 3:
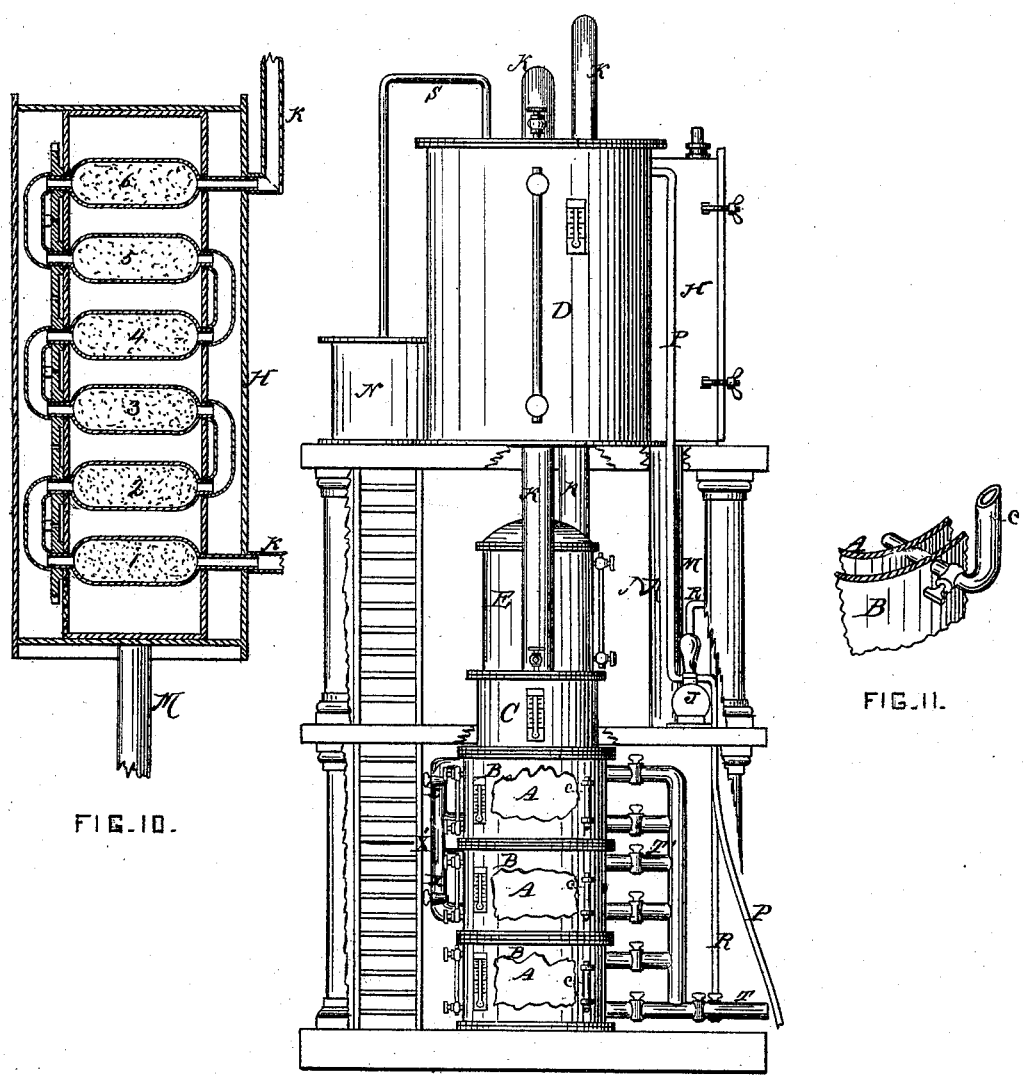
Figure 4:
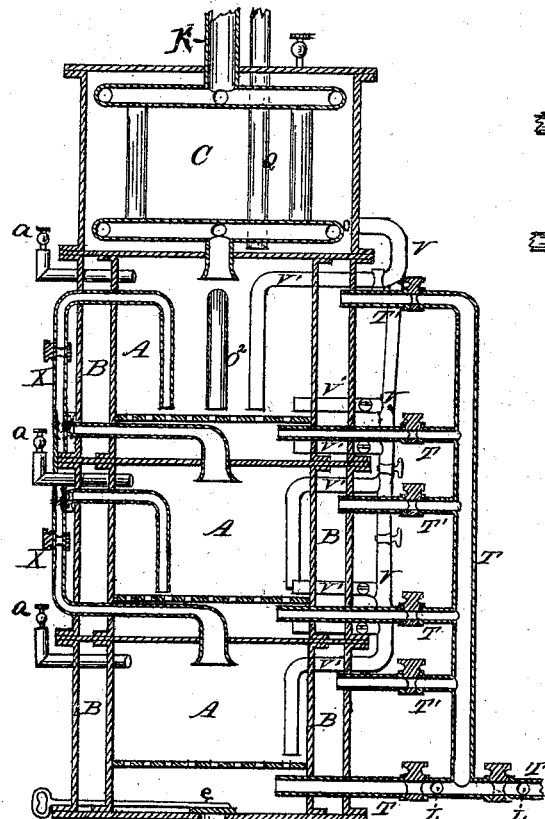
Figure 5:
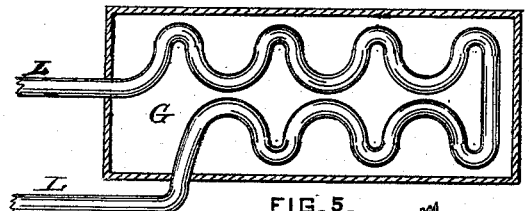
Figure 7:
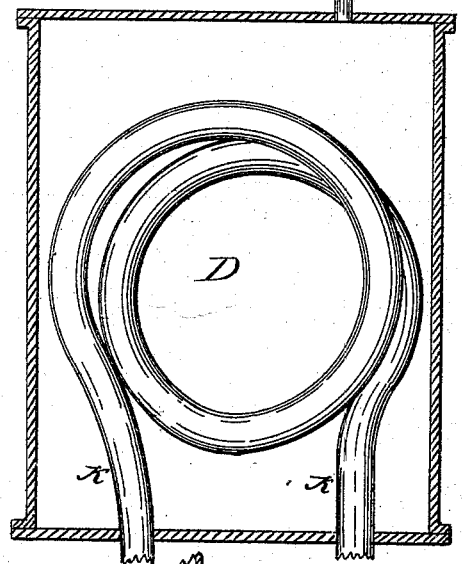
Figure 8:
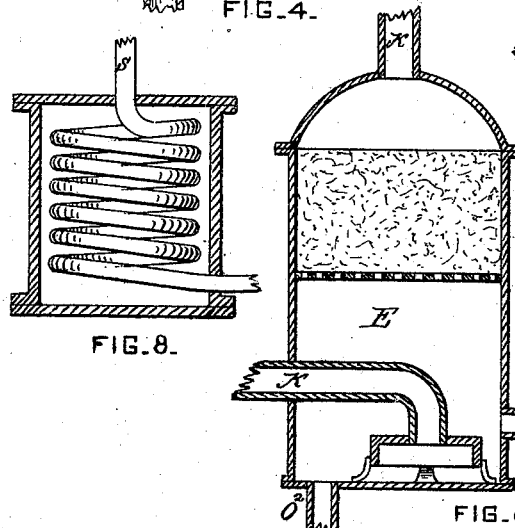
Figures 6, 9:
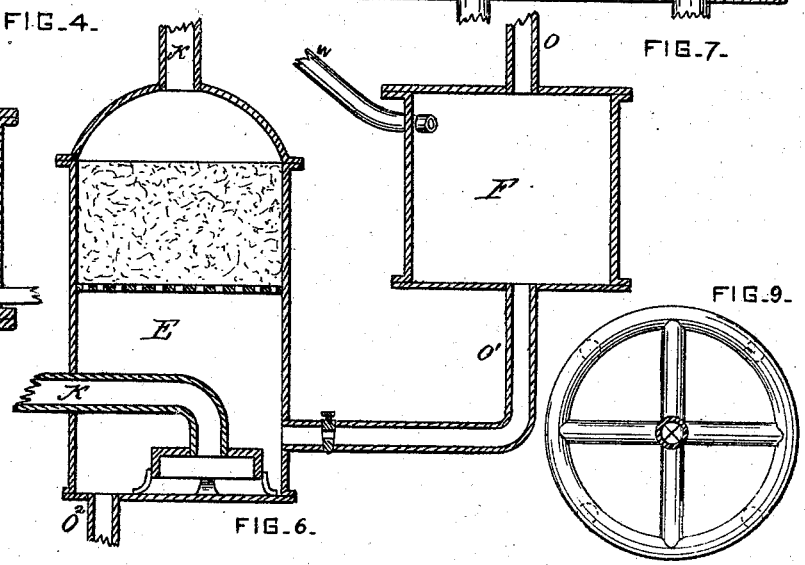

Figure 1, Sheet 1, is a perspective view of my apparatus. Fig. 2, Sheet 2, is a side elevation. Fig. 3, Sheet 3, is an end view. Fig. 4, Sheet 4, is a vertical section of the stills and charger. Fig. 5 is a horizontal section of the superheater. Fig. 6 is a vertical section of doubler and return-liquor chamber. Fig. 7 is a vertical section of heater. Fig. 8 is a vertical section of safety-condenser. Fig. 9 is a plan view of pipes in charger. Fig. 10 is a transverse vertical section of the revolving drum-chest, showing the drums. Fig. 11 is a section of still and steam-jacket, showing attachment of gravimeters.

A A A represent the stills; B B B, steam-jackets surrounding same; C, beer or wort charger; D, wort-heater; E, doubler; F, return-liquor chamber for weak liquor; G, superheater; H, revolving drum-chest; I, main condenser; J, wort or beer pump; K, vapor-pipes; L, superheater steam-pipes; M, superheater air-pipe, communicating with drum-chamber; N, safety-condenser; O, return-pipe for weak liquor; P, beer-pipe for conducting beer from mash-tub to heater; Q, beer-pipe for conducting beer from heater to charger; R, steam-pipe, for operating pump and conducting waste steam to heater; S, pipe from heater to safety-condenser; T, steam-pipe connecting with boiler and communicating with stills; T', branch of steam-pipe leading to interior of steam-jacket; V, pipe for conducting beer from charger C to stills A A A, and having branches V' leading into each still; X X, vapor-pipes for conducting vapor to upper stills from lower, and having suitable connecting-pipe X'.

The stills are three in number, and located one above the other. Each may be used independently, or in connection with one or both the others. Each is provided with a false or perforated bottom, situated three or more inches above the main bottom. A steam-jacket surrounds each still, leaving a space of two or more inches between the exterior of still and jacket.

The stills and jacket may be constructed of any suitable metal capable of withstanding the action of the liquor and superheated steam, preferably of copper.

Each still is provided with a thermometer, liquid-gage, vacuum-valve, and gravimeter.

The steam-pipe T is constructed with two branches communicating with each still, one of which opens into the still proper beneath the perforated bottom, and the other, T', communicates with the interior of the steam-jacket B.

Suitable cocks are provided in all the steam-pipes, so that the flow of steam can be regulated or shut off at will.

The steam-pipe is also connected with a branch, L, which passes through the superheater G, and again unites with the main pipe T at a point near its junction with T'. This pipe is also provided with cocks, so that the superheated steam may be shut off when deemed advisable by the operator.

The charger C is located above the stills, and communicates with them by means of the pipe V, which extends to the lower still, and has branches V' provided with suitable cocks leading into each of the upper stills. By means of this pipe either or all of the stills may be charged.

The wort or beer heater is a large barrel-shaped reservoir, located above the charger, and communicates with it by the beer-pipe Q. It is provided with vacuum-valve and liquid-gage, and connects with the safety-condenser N by pipe S.

The doubler E is an upright cylinder, having a convex disk top, and its interior is divided by a perforated horizontal screen into two compartments. The upper compartment above the screen is packed with purifying material, and is provided with a thermometer, liquid-gage, and vacuum-valve.

The drum or cylinder-chest H is a vertical metallic chest, located on the same plane with the heater D, and contains a frame supporting a number of cylinders or drums, packed with purifying material, and made to revolve by proper mechanical means. These cylinders are arranged horizontally, and the ends or axles of each are hollow, and fit into pipes communicating with the adjacent cylinders, whereby a continuous connection is formed from one to another. They are made portable, and are easily detached, and can be readily removed for the purpose of cleaning and repacking.

The vapor-pipe K extends from the upper still, where it commences with an inverted tunnel or bell-shaped mouth, upward into the charger C, where it is divided into a number of smaller pipes, extending around the entire circumference of the interior, and again converges and unites into one pipe at top. It then passes up into the heater D, where it is coiled once and again made to pass out at bottom, and enters the doubler E near its bottom, where it terminates with the opening or mouth downward. It again commences at top of doubler, and after describing a curve, passes into lower cylinder at bottom of drum-chest H, and emerges from upper cylinder at top; thence, after again describing a curve, it passes down into and through the main condenser I. An opening is made in pipe K near the point of its entrance into drum-chest H, for the purpose of allowing the weak spirits collected there to flow back through pipe O into the return-liquor chamber F. This chamber is a reservoir, located near the doubler, for the purpose of collecting such spirits as have not reached the proper degree of strength or volatility to enable them to pass with the vapor into the condenser I. It is provided with vacuum-valve, liquid-gage, hydrometer, and thermometer, and communicates with doubler by pipe $O^1$. A pipe, $O^2$, is also provided, leading from bottom of doubler E to upper still, for the purpose of returning the weak liquor to the still, to be revaporized.

When it is desired to commence the distilling process steam is applied to the pump J through the pipe R, and the wort or beer is drawn from fermented mash in under back through the pipe P, and forced into the heater D, where it is heated by steam introduced through the pipe R. When sufficiently heated it is conveyed into the charger C by the pipe Q, and thence into the stills A A A by the pipe V and its branches V'. Steam is then introduced at the bottom of each still through the pipe T, after having first passed through the superheater G by the pipe L. A jet is also introduced inside the steam-jacket B by the branch T'. By means of this steam the wort in each still is thoroughly and rapidly boiled, and the vapor generated in the lower stills is conveyed to the upper by means of the vapor-pipes $x x$, where it assists the boiling process, thence into the charger C, where it serves to more effectually heat the wort therein, the vapor-pipes being constructed to present the greatest amount of radiating surface. It then passes up into and through the coil in the heater D, where it assists and accelerates the heating process, and is then conveyed to the bottom of the doubler E, where it is discharged and forced through the purifying material with which the upper compartment is filled. The weaker and less volatile portion is allowed to flow back into still A through pipe $O^2$, to be redistilled. The vapor is then conducted by the pipe K from top of doubler to lower revolving drum in drum-chest H, and is forced successively through drums 1, 2, 3, 4, 5, and 6, and emerges into vapor-pipe at top and is conveyed down into and through main condenser I. All weak spirits are again drawn from vapor-pipe before it enters drum-chest by pipe O and conveyed into return-liquor chamber F, from which they are discharged through the pipe $O^1$ into the bottom of doubler E, and thence into the stills through pipe $O^2$, suitable cocks being provided in these pipes for that purpose. Here they are again vaporized, and all waste is thereby prevented. During the passage of the vapor through the revolving drums the drum-chest is tightly closed and a determinate degree of heat is maintained by means of the pipe M extending from the superheater G and communicating with the interior of the drum-chest H, whereby the drums are kept constantly surrounded with hot air.

It will be observed that by the arrangement of the vapor-pipes the spirit vapor is constantly carried up to the greatest elevation, whereby only the most volatile spirit reaches the top, and the weaker and less volatile is allowed to flow back to be revaporized. By this means the proof is constantly raised.

In order to avoid the danger of accident occasioned by too great a pressure upon the heater D the surplus vapor is allowed to escape into the safety-condenser N, where it is condensed and conveyed by the pipe W into the return-liquor chamber F, and thence to the stills to be revaporized. The stills, heater doubler, and return-liquor chamber, are each provided with a vacuum-valve, $a$, in order to avoid the danger of a collapse from the too sudden condensation of the vapor contained in each. A gravimeter, $c$, is attached to each still in order that the state of its contents may at any time be determined, and a hydrometer is attached to the return-liquor chamber, by which the operator is enabled to at any time test the specific gravity of the spirit therein. When it is desired to at any time free the stills, after the operation of distilling is suspended, from the slush and other refuse collected therein, the gate $e$ at the bottom of the still is opened and all the sediment and refuse is forced out by means of steam introduced by the pipe T, T' leading into the superheater being first closed.

Although I have represented the pipe V for charging the stills, as outside, I do not confine myself to this construction. It may, if deemed advisable, pass down on the inside of the stills, having suitable cocks and openings in each still for regulating the flow of the liquor.

Having thus described my invention, what I claim, and desire to secure by Letters Patent, is—

1. In a liquor-distilling apparatus the combination of two or more copper stills, each having a perforated boiling bottom, and surrounded with a steam-jacket, and connected by pipes having suitable cocks, whereby each still may be operated independently or all in conjunction, substantially as described, and for the purpose specified.

2. The combination, with a steam-superheater and connecting-pipes, of a series of independent jacketed stills, whereby the distilling capacity in actual use may be varied at pleasure, substantially as described, and for the purpose specified.

3. The combination of the still, the steam-superheater, the chamber H and mechanism therein, and the pipes K M, substantially as described, and for the purpose specified.

4. The combination of steam-superheater, the series of jacketed stills, the heater D, with the pipes K Q R, operating substantially as described, for the purpose specified.

5. The combination of steam-superheater, the still, the heater D, and the doubler E, for affecting the first separation of the low-proof liquors and their return to the still, substantially as described, and for the purpose specified.

6. The combination of the steam-superheater, the still, the heater D, the doubler, and the return-liquor chamber F and its pipes, for affecting the second separation of the low-proof liquors and their return to the still, substantially as described, and for the purpose specified.

7. The combination of the heater D, the return-liquor chamber F and its return-pipes, and the safety-condenser N and its pipes, substantially as described, and for the purpose specified.

8. The combination of a horizontal revolving cylinder containing purifying material, through which the spirit is passed by suitable pipes, and an inclosing-chamber to be supplied with heated air, substantially as described, and for the purpose specified.

9. In a liquor-distilling apparatus the combination of a series of horizontal revolving cylinders filled with purifying material, and pipes connecting their ends, substantially as described, and for the purpose specified.

10. The mechanism for affecting the continuous distillation of spirits, substantially as herein described, and consisting essentially in the combination of the still, the superheater, the heater, the doubler for making the first separation, the return-liquor chamber, and pipes O and O$^1$ for making second separation, the safety-condenser, the main condenser, and the connecting-pipes, substantially as described, and for the purpose specified.

In testimony that I claim the foregoing as my own I affix my signature in presence of two witnesses.

JOSEPH WM. REFORD.

Witnesses:
WM. J. JOHNSTON,
A. J. WHITAKER.